United States Patent
Poornachandran et al.

(10) Patent No.: US 12,112,194 B2
(45) Date of Patent: Oct. 8, 2024

(54) APPLICATION AWARE GRACEFUL OVER CURRENT PROTECTION FOR MULTI-SOCKET PLATFORMS

(71) Applicant: Intel Corporation, Santa Clara, CA (US)

(72) Inventors: Rajesh Poornachandran, Portland, OR (US); Rajendrakumar Chinnaiyan, Santa Clara, CA (US); Vincent Zimmer, Issaquah, WA (US); Ravikiran Chukka, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 17/122,693

(22) Filed: Dec. 15, 2020

(65) Prior Publication Data
US 2021/0141665 A1  May 13, 2021

(51) Int. Cl.
*G06F 9/48* (2006.01)
*G05F 1/625* (2006.01)
(Continued)

(52) U.S. Cl.
CPC ............ *G06F 9/4856* (2013.01); *G05F 1/625* (2013.01); *G06F 1/30* (2013.01); *G06F 9/45533* (2013.01);
(Continued)

(58) Field of Classification Search
CPC ...... G06F 9/4856; G06F 1/30; G06F 9/45533; G06F 1/28; G06F 1/305; G06F 1/3206;
(Continued)

(56) References Cited

U.S. PATENT DOCUMENTS

| | | | | |
|---|---|---|---|---|
| 9,959,188 | B1 * | 5/2018 | Krishnan | G06F 9/45533 |
| 2006/0161794 | A1 * | 7/2006 | Chiasson | G06F 1/3203 |
| | | | | 713/300 |
| 2006/0253633 | A1 * | 11/2006 | Brundridge | G06F 13/409 |
| | | | | 710/104 |
| 2008/0104436 | A1 * | 5/2008 | Sawyers | G06F 1/3203 |
| | | | | 713/323 |

(Continued)

OTHER PUBLICATIONS

Intel Corporation, "Intel technical Advisory: Special Handling Instructions if a System Exhibits a Shut Down with POwer Supply Amber LED Illuminated—Additional Caution Required," Sep. 7, 2012, 3 pages.

(Continued)

*Primary Examiner* — Jaweed A Abbaszadeh
*Assistant Examiner* — Brian J Corcoran
(74) *Attorney, Agent, or Firm* — Jordan IP Law, LLC

(57) ABSTRACT

Systems, apparatuses and methods may provide for technology that detects an over current condition associated with a voltage regulator in a computing system, identifies a configurable over current protection policy associated with the voltage regulator, and automatically takes a protective action based on the configurable over current protection policy. In one example, the protective action includes one or more of a frequency throttle of a processor coupled to the voltage regulator in isolation from one or more additional processors in the computing system, a deactivation of the processor in isolation from the one or more additional processors, an issuance of a virtual machine monitor notification, an issuance of a data center fleet manager notification, or an initiation of a migration of a workload from the processor to at least one of the additional processor(s).

21 Claims, 7 Drawing Sheets

(51) Int. Cl.
  *G06F 1/30*      (2006.01)
  *G06F 9/455*     (2018.01)
  *H02H 1/00*      (2006.01)
(52) U.S. Cl.
  CPC ........ *H02H 1/0007* (2013.01); *H02H 1/0092* (2013.01)
(58) Field of Classification Search
  CPC ...... G06F 1/3237; G06F 1/324; G06F 1/3287; G06F 1/329; G06F 9/442; G06F 9/4881; G05F 1/625; H02H 1/0007; H02H 1/0092; H02H 7/20
  See application file for complete search history.

(56) References Cited

U.S. PATENT DOCUMENTS

| | | | | |
|---|---|---|---|---|
| 2016/0142054 A1* | 5/2016 | Mojumder | ............ | G06F 1/3296 327/333 |
| 2016/0378532 A1* | 12/2016 | Vincent | ................ | G06F 9/5088 718/1 |
| 2017/0364132 A1* | 12/2017 | Gendler | ................ | G06F 1/3206 |

OTHER PUBLICATIONS

P. Kocher et al., "Differential Power Analysis," <paulkocher.com/doc/DifferentialPowerAnalysis.pdf>, retrieved Nov. 5, 2020, 10 pages.

NCC Group, "Implementing Practical Electrical Glitching Attacks," Nov. 2015, 61 pages.

\* cited by examiner

APPLICATION AWARE GRACEFUL OVER CURRENT PROTECTION FOR MULTI-SOCKET PLATFORMS

TECHNICAL FIELD

Embodiments generally relate to over current protection. More particularly, embodiments relate to Application Aware Graceful Over Current Protection (AAGOCP) for multi-socket platforms.

BACKGROUND

Server products may support over current protection (OCP) as a safety feature to shut down a platform (e.g., abruptly) when an excessive current draw occurs. Although the OCP safety feature helps to protect hardware components, a poor service level agreement (SLA) experience may result from the abrupt shutdown in terms of system availability, handling of "blast radius" (e.g., error propagation), data loss, and so forth.

DETAILED DESCRIPTION OF EMBODIMENTS

Figure 1:
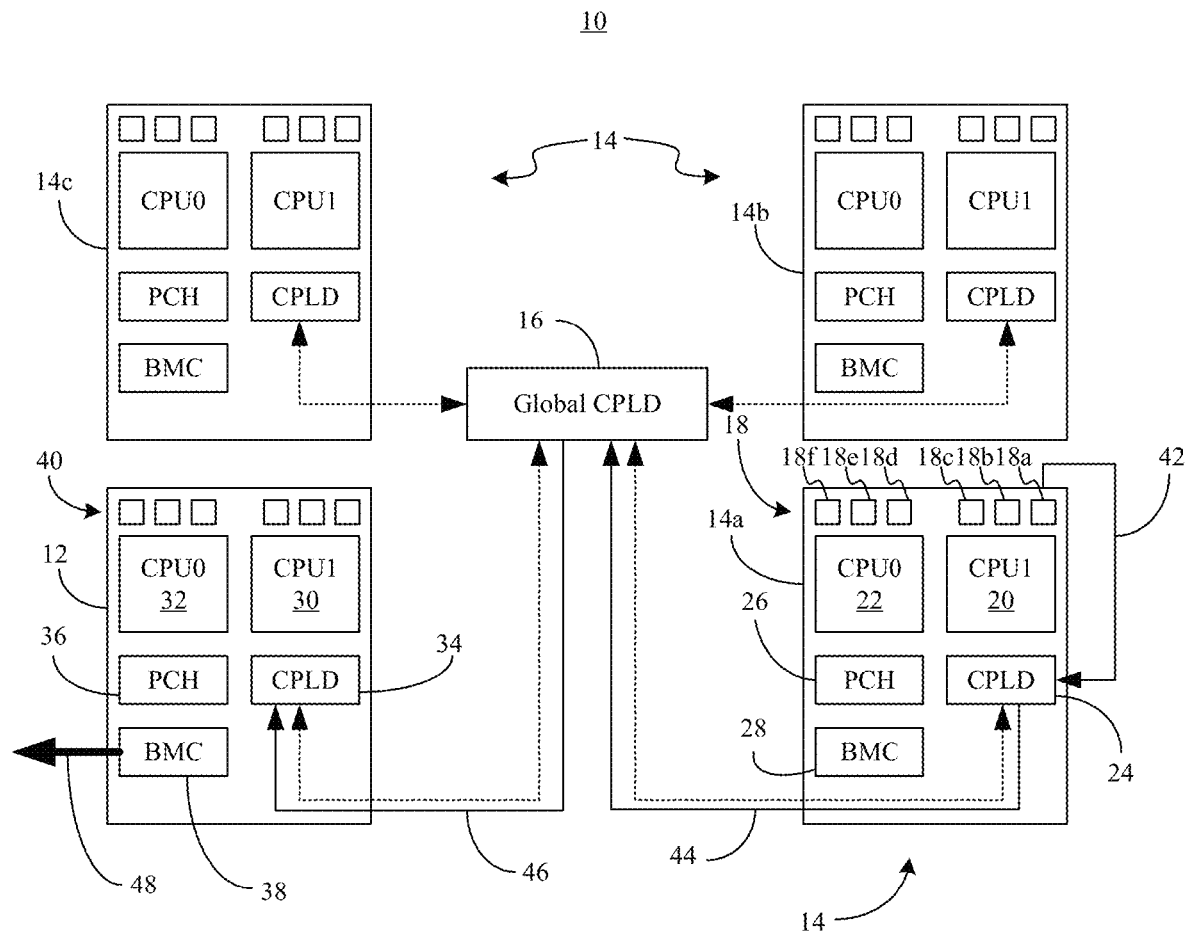
FIG. 1 is a block diagram of an example of a performance-enhanced computing system according to an embodiment.

FIG. 1 shows a performance-enhanced computing platform/system 10 that includes a primary circuit board 12 (e.g., legacy, manager, master), a plurality of secondary circuit boards 14 (14a-14c), and a global complex programmable logic device (CPLD) 16. In the illustrated example, a first board 14a in the plurality of secondary circuit boards 14 includes a plurality of voltage regulators (VRs) 18 (18a-18f), a first central processing unit (CPU, e.g., "CPU1" host processor plugged into a first socket) 20 coupled to at least one of the VRs 18, a second CPU 22 ("CPU2" plugged into a second socket) coupled to at least one of the VRs 18, a local CPLD 24, a platform controller hub (PCH, e.g., input output/IO module) 26, and a baseboard management controller (BMC) 28. A second board 14b and a third board 14c may be configured similarly to the first board 14a.

In one example, the primary circuit board 12 includes a first CPU 30 ("CPU1" plugged into a first socket), a second CPU 32 ("CPU2") plugged into a second socket, a local CPLD 34, a PCH 36, a BMC 38, and a plurality of VRs 40. Accordingly, the illustrated computing system 10 is an 8-socket system. In an embodiment, the computing system 10 is a server node of a data center.

A first VR 18a may supply power to, for example, the first CPU 20. If the first VR 18a encounters an OCP fault (e.g., over current condition), the first VR 18a may de-assert a power good signal 42 in response to the OCP fault. Upon detecting the de-asserted power good signal 42, the local CPLD 24 may send a sleep signal 44 (e.g., Advanced Configuration and Power Interface/ACPI S4 signal) to the global CPLD 16, which issues a forwarded signal 46 to the local CPLD 34 on the primary circuit board 12. In an embodiment, the local CPLD 34 identifies a configurable over current protection policy associated with the first VR 18a and automatically takes a protective action based on the configurable over current protection policy. For example, the configurable over current protection policy may include one or more telemetry thresholds and corresponding system management interrupt (SMI) capabilities. As will be discussed in greater detail, the BMC 38 may be provisioned with the SMI capabilities and an SMI transfer monitor (STM, not shown) may be provisioned with the telemetry threshold(s). Additionally, the BMC 38 may communicate with a remote administrator (e.g., management console) via an out-of-band (OOB) channel 48 to trigger/initiate higher level actions such as fleet management and/or workload migration operations.

Thus, rather than abruptly powering down all of the circuit boards 14, 12, the primary circuit board 12 may take less disruptive actions such as, for example, frequency throttling the first CPU 20 in isolation from (e.g., independently of) the additional processors in the computing system 10, deactivating the first CPU 20 in isolation from the additional processors in the computing system 10, issuing a virtual machine monitor (VMM, e.g., hypervisor) notification, issuing a data center fleet manager notification, initiating a migration of a workload from the first CPU 20 to at least one of the additional processors in the computing system 10, logging the OCP fault for crowd-sourced data analytics (e.g., to support improved workload orchestration and platform reliability, serviceability, availability/RAS), and so forth. The computing system 10 is therefore considered performance-enhanced at least to the extent that frequency throttling and/or deactivating the first CPU 20 in isolation from the other processors in the system 10 improves the SLA experience (e.g., in terms of system availability, handling of the blast radius, data loss, etc.).

Figure 2:
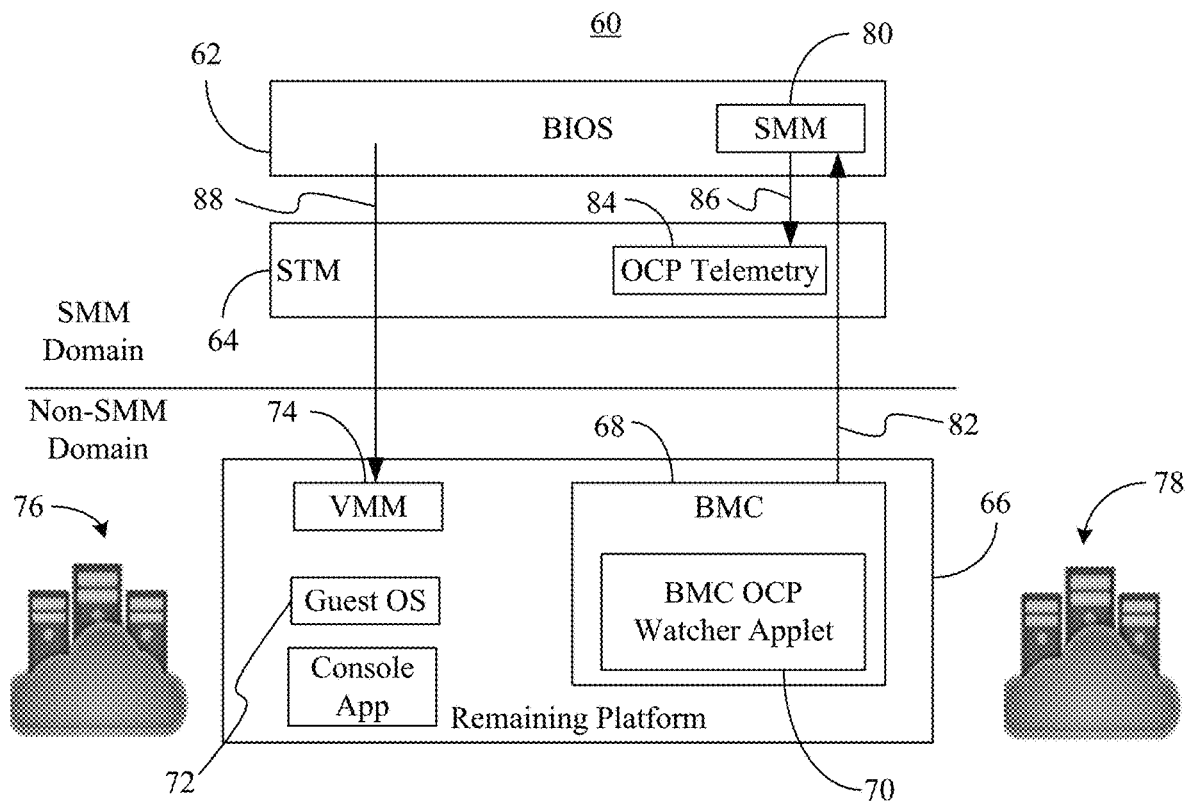
FIG. 2 is a block diagram of an example of a software architecture according to an embodiment.

FIG. 2 shows a software architecture 60 having a basic input output system (BIOS) 62 and an STM in a system management mode (SMM) domain and a remaining platform 66 in a non-SMM domain. In the illustrated example, a BMC 68 includes a BMC OCP watcher applet 70 that hosts AAGOCP core logic with the following capabilities:

Thresholds/configurable policies can be provisioned via an OOB BMC remote console 78 and VR assertions on any preliminary spikes, along with workload configurations and PMU (power management unit, Punit) configurations may be logged and communicated to a remote administrator/orchestrator for debugging and/or record keeping/root cause analysis.

Policy-based actions such as, for example, throttling the specific core/uncore/socket to mitigate the spike, alerting a platform operating system (OS, not shown), VMM 74, guest OS 72 and/or remote orchestrator 76 to migrate workloads to avoid data loss, offline specific cores/sockets, etc., in conjunction with a PMU, may be taken.

The illustrated BIOS 62 includes an SMM 80, where the BMC 68 may assert an OCP_SMI# signal 82 (e.g., $OCP_{BMC\text{-}BIOS}$) that is processed by a handler (e.g., SMM_OCP_Handler) in the SMM 80. In an embodiment, the STM includes OCP telemetry 84, which is an applet that provides opaque logging/telemetry that is protected from the potentially vulnerable VMM 74. In the illustrated example, the SMM 80 issues telemetry signals 86 (e.g., $OCP_{Telemetry}$) to the OCP telemetry 84 in the STM 64 and the BIOS 62 issues alert signals 88 (e.g., $OCP_{VMM\_Alert}$) to the VMM 74 via the STM 64. Additionally, log data may be exported to the remote console 78 (e.g., data center management console via STM->BMC communications).

Figure 3:
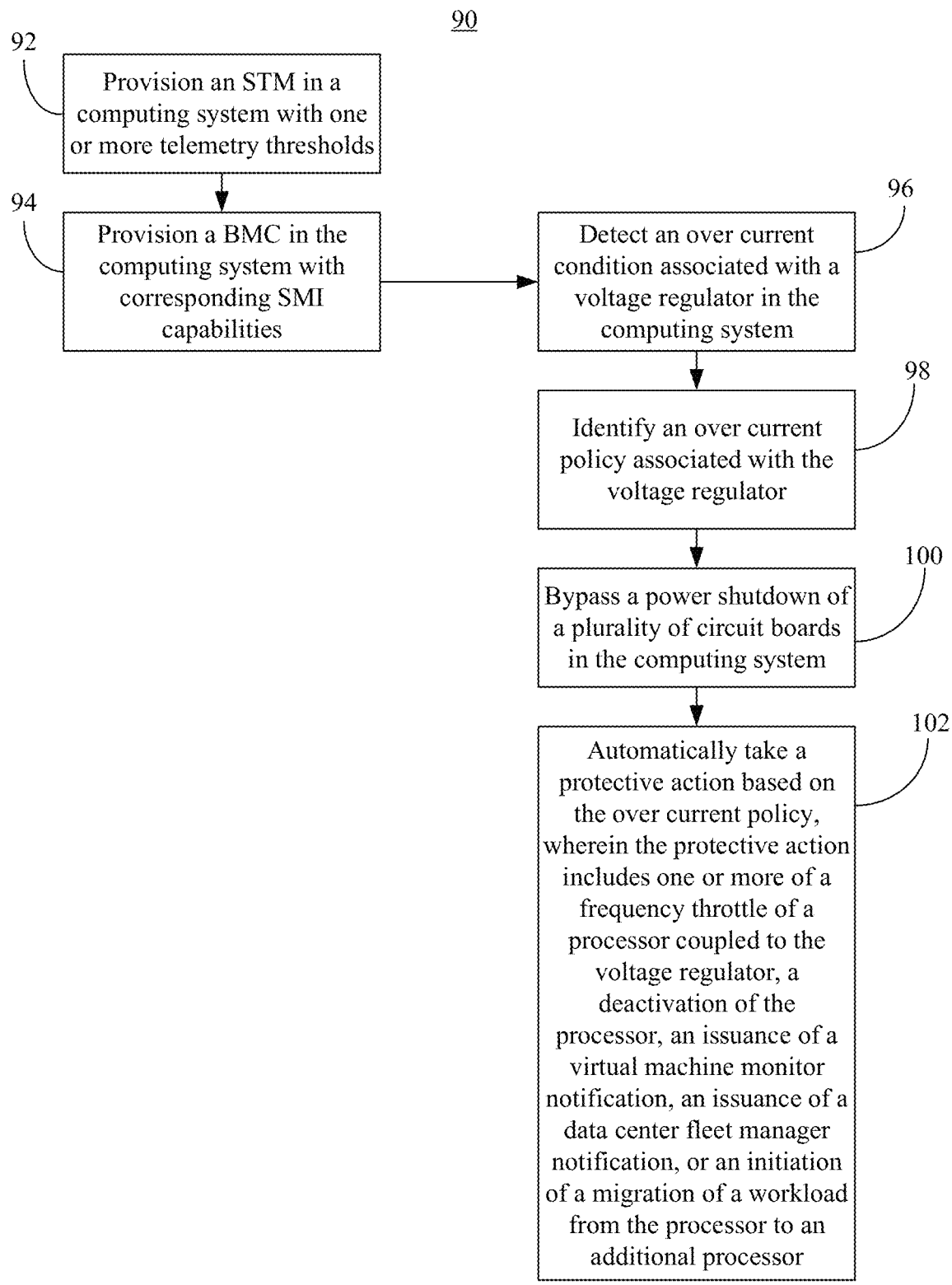
FIG. 3 is a flowchart of an example of a method of operating a performance-enhanced computing system according to an embodiment.

FIG. 3 shows a method 90 of operating a performance-enhanced computing system. The method 90 may generally be implemented in a primary circuit board such as, for example, the primary circuit board 12 (FIG. 1), already discussed. More particularly, the method 90 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), CPLDs, in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The illustrated processing block 92 provides for provisioning an STM in a computing system with one or more telemetry thresholds (e.g., over current thresholds), where block 94 provisions a BMC in the computing system with corresponding SMI capabilities. In an embodiment, block 94 provisions the BMC with the corresponding SMI via an OOB channel. The SMI capabilities may include, for example, signals, settings and/or parameters to be used in communications between the BMC and a BIOS SMM. In an embodiment, the telemetry thresholds and corresponding SMI capabilities constitute a configurable over current protection policy for a multi-socket platform.

Block 96 detects an over current condition associated with a VR in the computing system. In one example, block 96 involves determining that a power good signal has been de-asserted by the VR. A configurable over current protection policy associated with the VR may be identified at block 98. Illustrated block 100 bypasses a power shutdown of a plurality of circuit boards in the computing system, where block 102 automatically takes a protective action based on the configurable over current protection policy. In the illustrated example, the protective action includes one or more of a frequency throttle of a processor coupled to the VR (e.g., in isolation from one or more additional processors in the computing system), a deactivation of the processor coupled to the VR (e.g., in isolation from the one or more additional processors), an issuance of a VMM notification, an issuance of a data center fleet manager notification, or an initiation of a migration of a workload from the processor to at least one of the additional processors.

As already noted, notifying the VMM and/or data center fleet manager about the OCP event gives applications the opportunity to prevent data loss, or based on the application tolerance, the feet manager may migrate the workload to another machine. Indeed, the data center fleet manager notification may include the telemetry information (e.g., associated with the over current condition) collected by the STM. In such a case, the data center fleet manager notification may be issued to a scalability component (e.g., scalability manager) of a hyper-scale data center (e.g., a facility owned and operated by the entity that it supports).

In an embodiment, the protective action is taken by a BMC on a primary circuit board in the computing system and the VR is on a secondary circuit board in the computing system. The method 90 therefore enhances performance at least to the extent that frequency throttling and/or deactivating the processor in isolation from the other processors in the system improves the SLA experience in terms of system availability, handling of the blast radius, and/or data loss.

Figure 4:
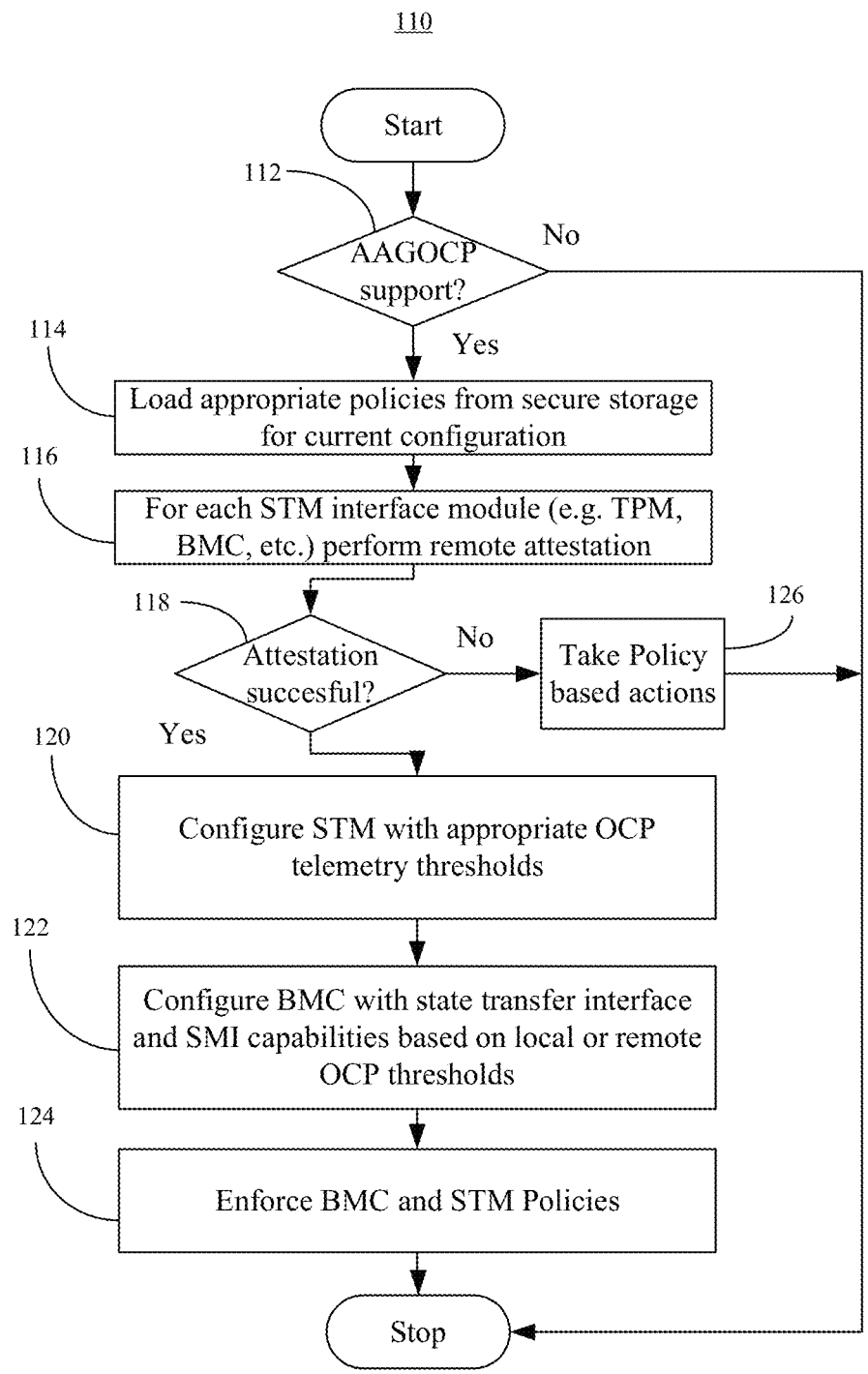
FIG. 4 is a flowchart of an example of a method of configuring over current protection in a performance-enhanced computing system according to an embodiment.

FIG. 4 shows a method 110 of configuring OCP in a performance-enhanced computing system. The method 110 may generally be implemented in a primary circuit board such as, for example, the primary circuit board 12 (FIG. 1), already discussed. More particularly, the method 110 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated block 112 determines whether AAGOCP support is present. If so, block 114 loads appropriate policies from secure storage for the current configuration. For each STM interface module (e.g., trusted platform module/TPM, BMC, etc.), block 116 may perform remote attestation. If it is determined at block 118 that the remote attestation is successful, block 120 configures the STM with the appropriate OCP telemetry thresholds. Additionally, block 122 may configure the BMC with state transfer interface (e.g., REDFISH representational state transfer/RESTful interface) and SMI capabilities based on local or remote OCP thresholds. In an embodiment, block 124 enforces the BMC and STM policies and the method 110 terminates. If it is determined at block 118 that the remote attestation is not successful, illustrated block 126 takes policy based actions and the method 110 terminates. If it is determined at block 112 that AAGOCP is not supported, the illustrated method 110 terminates.

Figure 5:
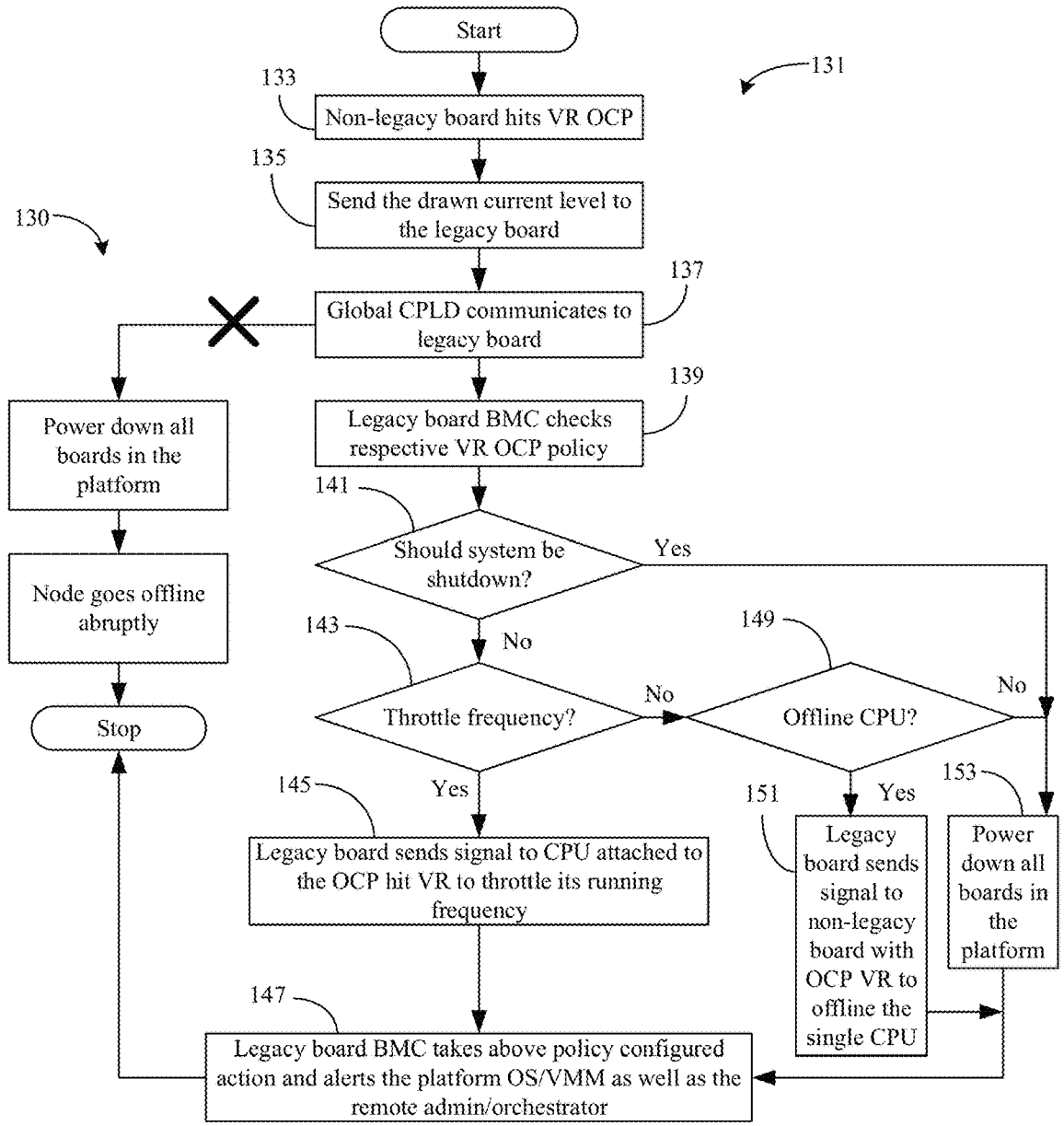
FIG. 5 is a flowchart of a comparative example of a conventional method of operating a computing system and a method of operating a computing system according to an embodiment.

FIG. 5 shows a comparative example of a conventional method 130 of operating a computing system and an enhanced method 131 of operating a performance-enhanced computing system. The method 131 may generally be implemented in a computing system such as, for example, the computing system 10 (FIG. 1), already discussed. More particularly, the method 131 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated block 133 detects that a non-legacy board has hit a VR OCP threshold, where block 135 sends the drawn current level to a legacy board. In one example, a global CPLD communicates the drawn current level to the legacy board at block 137. In an embodiment, the legacy board BMC checks the respective VR OCP policy at block 139. A determination may be made at block 141 as to whether the system is to be shut down. If not, illustrated block 143 determines whether the frequency of the affected processor is to be throttled. If so, the legacy board sends a signal at block 145 to the processor attached to the VR that encountered the over current condition, where the signal causes the operating/running frequency of the processor to be throttled. Additionally, the BMC on the legacy board may take the above policy configured action at block 147 and alert the platform OS/VMM as well as a remote administrator/orchestrator of the over current condition.

If it is determined at block 143 that the configurable over current protection policy does not call for frequency throttling, illustrated block 149 determines whether the processor is to be taken offline (e.g., deactivated). If so, the legacy board sends a signal at block 151 to the non-legacy board with the OCP VR to offline the single processor (e.g., in isolation from the other processors in the system). The illustrated method 131 then proceeds to block 147. If it is determined at block 141 that the system is to be shut down, illustrated block 153 powers down all boards in the system and the method 131 proceeds to block 147. The illustrated method 131 therefore bypasses the method 130 (e.g., always powering down all boards in the platform and abruptly taking the node offline).

Figure 6:
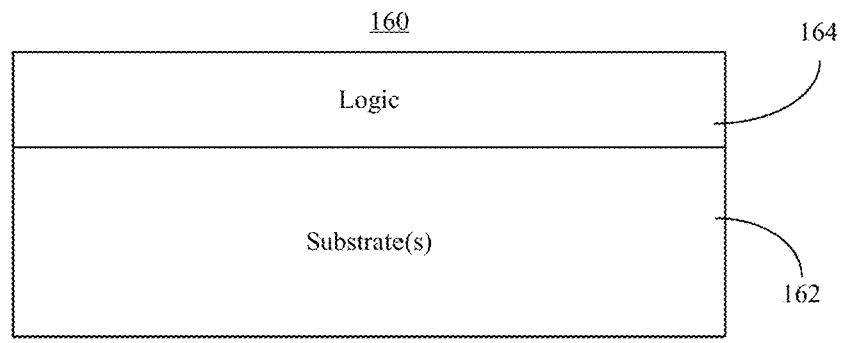
FIG. 6 is an illustration of an example of a semiconductor package apparatus according to an embodiment.

FIG. 6 shows a semiconductor apparatus 160 (e.g., chip, die and/or package). The illustrated apparatus 160 includes one or more substrates 162 (e.g., silicon, sapphire, gallium arsenide) and logic 164 (e.g., transistor array and other integrated circuit/IC components) coupled to the substrate(s) 162. In an embodiment, the logic 164 implements one or more aspects of the method 90 (FIG. 3), the method 110 (FIG. 4) and/or the method 131 (FIG. 5), already discussed. Thus, the logic 164 may detect an over current condition associated with a voltage regulator in a computing system, identify a configurable over current protection policy associated with the voltage regulator, and automatically take a protective action based on the configurable over current protection policy. In an embodiment, the protective action includes one or more of a frequency throttle of a processor coupled to the voltage regulator in isolation from one or more additional processors in the computing system, a deactivation of the processor in isolation from the one or more additional processors, an issuance of a virtual machine monitor notification, an issuance of a data center fleet manager notification, or an initiation of a migration of a workload from the processor to at least one of the additional processor(s). The apparatus 160 is therefore performance-enhanced at least to the extent that frequency throttling and/or deactivating the processor in isolation from the other processors in the system improves the SLA experience in terms of system availability, handling of the blast radius, and/or data loss.

The logic 164 may be implemented at least partly in configurable logic or fixed-functionality hardware logic. In one example, the logic 164 includes transistor channel regions that are positioned (e.g., embedded) within the substrate(s) 162. Thus, the interface between the logic 164 and the substrate(s) 162 may not be an abrupt junction. The logic 164 may also be considered to include an epitaxial layer that is grown on an initial wafer of the substrate(s) 162.

Figure 7:
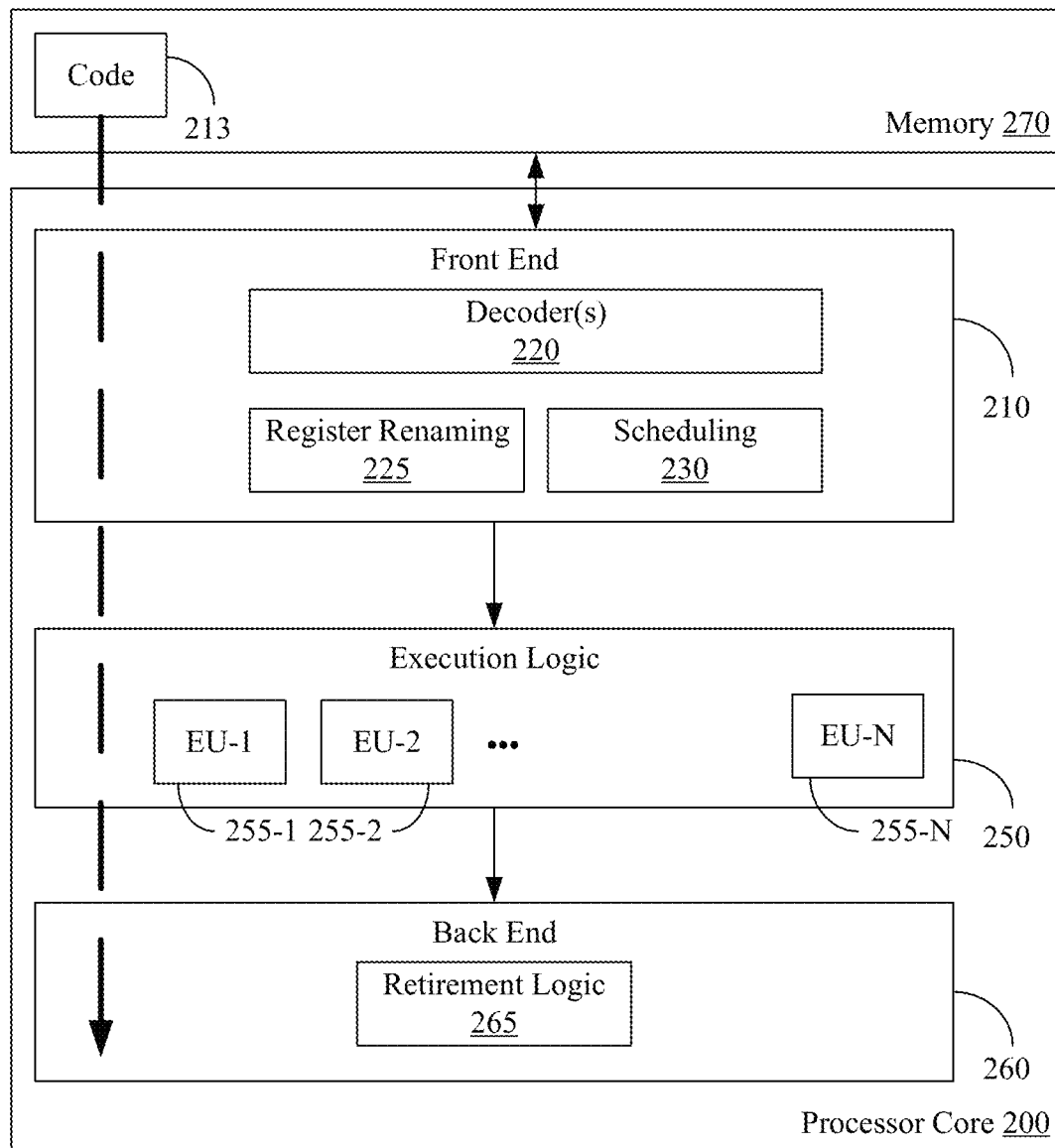
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 90 (FIG. 3), the method 110 (FIG. 4) and/or the method 131 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
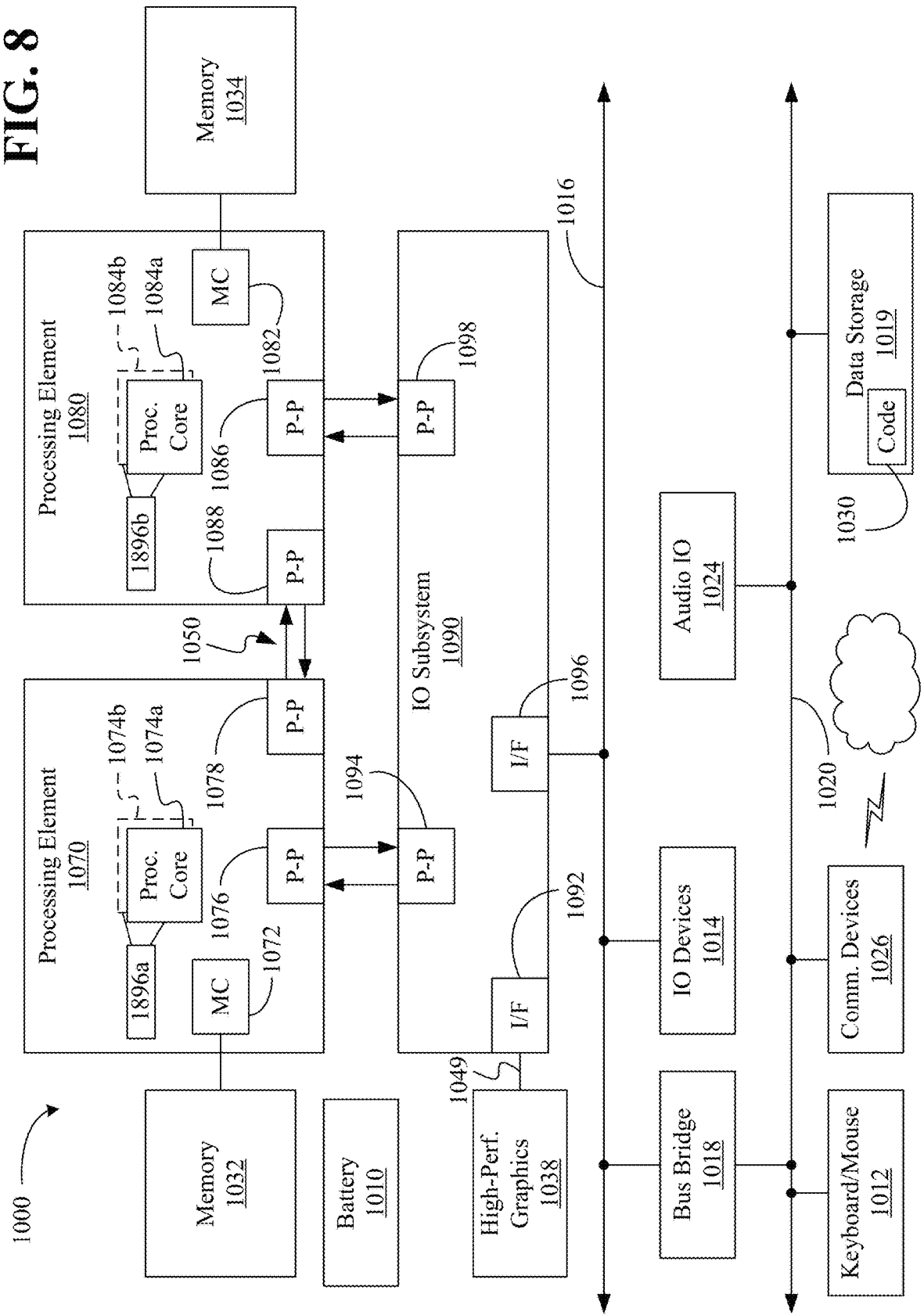
FIG. 8 is a block diagram of an example of a multi-processor based computing system according to an embodiment.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 90 (FIG. 3), the method 110 (FIG. 4) and/or the method 131 (FIG. 5), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 includes a performance-enhanced computing system comprising one or more circuit boards including a voltage regulator and a processor coupled to the voltage regulator, and logic coupled to one or more substrates, the logic to detect an over current condition associated with the voltage regulator, identify a configurable over current protection policy associated with the voltage regulator, and automatically take a protective action based on the configurable over current protection policy, wherein the protective action includes one or more of a frequency throttle of the processor in isolation from one or more additional processors in the computing system, a deactivation of the processor in isolation from the one or more additional processors, an issuance of a virtual machine monitor notification, an issuance of a data center fleet manager notification, or an initiation of a migration of a workload from the processor to at least one of the one or more additional processors.

Example 2 includes the computing system of Example 1, wherein the logic coupled to the one or more substrates is to bypass a power down of the one or more circuit boards.

Example 3 includes the computing system of Example 1, wherein the configurable over current protection policy is to include one or more telemetry thresholds and corresponding system management interrupt (SMI) capabilities.

Example 4 includes the computing system of Example 3, further including a baseboard management controller (BMC), wherein the logic coupled to the one or more substrates is to provision the BMC with the corresponding SMI capabilities via an out-of-band channel.

Example 5 includes the computing system of Example 3, further including an SMI transfer monitor (STM) to collect telemetry information associated with the over current condition, wherein the logic coupled to the one or more substrates is to provision the STM with the one or more telemetry thresholds, wherein the data center fleet manager notification includes the telemetry information, and wherein the data center fleet manager notification is issued to a scalability component of a hyper-scale data center.

Example 6 includes the computing system of any one of Examples 1 to 5, further including a primary circuit board, wherein the primary circuit board includes a baseboard management controller (BMC), the one or more circuit boards includes a secondary circuit board, and the protective action is to be taken by the BMC.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to detect an over current condition associated with a voltage regulator in a computing system, identify a configurable over current protection policy associated with the voltage regulator, and automatically take a protective action based on the configurable over current protection, wherein the protective action includes one or more of a frequency throttle of a processor coupled to the voltage regulator in isolation from one or more additional processors in the computing system, a deactivation of the processor in isolation from the one or more additional processors, or an initiation of a migration of a workload from the processor to at least one of the one or more additional processors.

Example 8 includes the apparatus of Example 7, wherein the logic coupled to the one or more substrates is to bypass a power down of one or more circuit boards in the computing system.

Example 9 includes the apparatus of Example 7, wherein the configurable over current protection policy is to include one or more telemetry thresholds and corresponding system management interrupt (SMI) capabilities.

Example 10 includes the apparatus of Example 9, wherein the logic coupled to the one or more substrates is to provision a baseboard management controller with the corresponding SMI capabilities via an out-of-band channel.

Example 11 includes the apparatus of Example 9, wherein the logic coupled to the one or more substrates is to provision an SMI transfer monitor (STM) with the one or more telemetry thresholds, and wherein the STM is to collect telemetry information associated with the over current condition, wherein the data center fleet manager notification includes the telemetry information, and wherein the data center fleet manager notification is issued to a scalability component of a hyper-scale data center.

Example 12 includes the apparatus of any one of Examples 7 to 11, wherein the protective action is to be taken by a baseboard management controller on a primary circuit board in the computing system, and wherein the voltage regulator is to be on a secondary circuit board in the computing system.

Example 13 includes the apparatus of any one of Examples 7 to 12, wherein the logic coupled to the one or more substrates includes transistor channel regions that are positioned within the one or more substrates.

Example 14 includes at least one computer readable storage medium comprising a set of executable program instructions, which when executed by a computing system, cause the computing system to detect an over current condition associated with a voltage regulator in the computing system, identify a configurable over current protection policy associated with the voltage regulator, and automatically take a protective action based on the configurable over current protection, wherein the protective action includes one or more of a frequency throttle of a processor coupled to the voltage regulator in isolation from one or more additional processors in the computing system, a deactivation of the processor in isolation from the one or more additional processors, an issuance of a virtual machine monitor notification, an issuance of a data center fleet manager notification, or an initiation of a migration of a workload from the processor to at least one of the one or more additional processors.

Example 15 includes the at least one computer readable storage medium of Example 14, wherein the instructions, when executed, further cause the computing system to bypass a power down of one or more circuit boards in the computing system.

Example 16 includes the at least one computer readable storage medium of Example 14, wherein the configurable over current protection policy is to include one or more telemetry thresholds and corresponding system management interrupt (SMI) capabilities.

Example 17 includes the at least one computer readable storage medium of Example 16, wherein the instructions, when executed, further cause the computing system to provision a baseboard management controller with the corresponding SMI capabilities via an out-of-band channel.

Example 18 includes the at least one computer readable storage medium of Example 16, wherein the instructions, when executed, further cause the computing system to provision an SMI transfer monitor (STM) with the one or more telemetry thresholds, and wherein the STM is to collect telemetry information associated with the over current condition, wherein the data center fleet manager notification includes the telemetry information, and wherein the data center fleet manager notification is issued to a scalability component of a hyper-scale data center.

Example 19 includes the at least one computer readable storage medium of any one of Examples 14 to 18, wherein the protective action is to be taken by a baseboard management controller on a primary circuit board in the computing system, and wherein the voltage regulator is to be on a secondary circuit board in the computing system.

Example 20 includes a method of operating a performance-enhanced computing system, the method comprising detecting an over current condition associated with a voltage regulator in a computing system, identifying a configurable over current protection policy associated with the voltage regulator, and automatically taking a protective action based on the configurable over current protection policy, wherein the protective action includes one or more of a frequency throttle of a processor coupled to the voltage regulator in isolation from one or more additional processors in the computing system, a deactivation of the processor in isolation from the one or more additional processors, an issuance of a virtual machine monitor notification, an issuance of a data center fleet manager notification, or an initiation of a migration of a workload from the processor to at least one of the one or more additional processors.

Example 21 includes the method of Example 20, further including bypassing a power down of one or more circuit boards in the computing system.

Example 22 includes the method of Example 20, wherein the configurable over current protection policy includes one or more telemetry thresholds and corresponding system management interrupt (SMI) capabilities.

Example 23 includes the method of Example 22, further including provisioning a baseboard management controller with the corresponding SMI capabilities via an out-of-band channel.

Example 24 includes the method of Example 22, further including provisioning an SMI transfer monitor (STM) with the one or more telemetry thresholds, and wherein the STM collects telemetry information associated with the over current condition, wherein the data center fleet manager notification includes the telemetry information, and wherein the data center fleet manager notification is issued to a scalability component of a hyper-scale data center.

Example 25 includes the method of any one of Examples 20 to 24, wherein the protective action is taken by a baseboard management controller on a primary circuit board in the computing system, and wherein the voltage regulator is on a secondary circuit board in the computing system.

Example 26 includes an apparatus comprising means for performing the method of any one of claims 20 to 24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a plurality of circuit boards, each of the plurality of circuit boards including a voltage regulator and a processor coupled to the voltage regulator, wherein the plurality of circuit boards includes a primary circuit board and a secondary circuit board, the primary circuit board having a baseboard management controller (BMC); and
   logic coupled to one or more substrates, wherein the logic is arranged on the primary circuit board, the logic to:
      receive an indication of a detected over current condition associated with a first voltage regulator on the secondary circuit board, wherein the indication is to be received while bypassing the BMC,
      identify a configurable over current protection policy associated with the first voltage regulator,
      automatically take a first protective action based on the configurable over current protection policy, wherein the first protective action includes one or more of a frequency throttle of a first processor on the secondary circuit board in isolation from one or more additional processors in the computing system, or a deactivation of the first processor in isolation from the one or more additional processors, wherein the first protective action is to be communicated to the secondary circuit board while bypassing the BMC, and
      initiate, via a communication from the BMC to a remote administrator, a second protective action based on the configurable over current protection policy, wherein the second protective action includes one or more of a data center fleet manager notification or a migration of a workload from the first processor to at least one of the other processors,
   wherein the first protective action and the second protective action are each responsive to the indication of the detected over current condition.

2. The computing system of claim 1, wherein the logic coupled to the one or more substrates is to bypass a power down of the one or more circuit boards.

3. The computing system of claim 1, wherein the configurable over current protection policy is to include one or more telemetry thresholds and corresponding system management interrupt (SMI) capabilities.

4. The computing system of claim 3, wherein the logic coupled to the one or more substrates is to provision the BMC with the corresponding SMI capabilities via an out-of-band channel.

5. The computing system of claim 3, further including an SMI transfer monitor (STM) to collect telemetry information associated with the over current condition, wherein the logic coupled to the one or more substrates is to provision the STM with the one or more telemetry thresholds, wherein the data center fleet manager notification includes the telemetry information, and wherein the data center fleet manager notification is issued to a scalability component of a hyperscale data center.

6. A semiconductor apparatus comprising:
one or more substrates; and
logic coupled to the one or more substrates, wherein the logic is arranged on a primary circuit board and is implemented at least partly in one or more of configurable logic or fixed-functionality hardware logic, the logic coupled to the one or more substrates to:
receive an indication of a detected over current condition associated with a first voltage regulator on a secondary circuit board in a computing system, wherein the computing system comprises a plurality of circuit boards, each of the plurality of circuit boards including a voltage regulator and a processor coupled to the voltage regulator, wherein the plurality of circuit boards includes the primary circuit board and the secondary circuit board, the primary circuit board having a baseboard management controller (BMC), and wherein the indication is to be received while bypassing the BMC;
identify a configurable over current protection policy associated with the first voltage regulator;
automatically take a first protective action based on the configurable over current protection policy, wherein the first protective action includes one or more of a frequency throttle of a first processor on the secondary circuit board in isolation from one or more additional processors in the computing system, or a deactivation of the first processor in isolation from the one or more additional processors, wherein the first protective action is to be communicated to the secondary circuit board while bypassing the BMC, and
initiate, via a communication from the BMC to a remote administrator, a second protective action based on the configurable over current protection policy, wherein the second protective action includes one or more of a data center fleet manager notification or a migration of a workload from the first processor to at least one of the other processors,
wherein the first protective action and the second protective action are each responsive to the indication of the detected over current condition.

7. The apparatus of claim 6, wherein the logic coupled to the one or more substrates is to bypass a power down of one or more circuit boards in the computing system.

8. The apparatus of claim 6, wherein the configurable over current protection policy is to include one or more telemetry thresholds and corresponding system management interrupt (SMI) capabilities.

9. The apparatus of claim 8, wherein the logic coupled to the one or more substrates is to provision the BMC with the corresponding SMI capabilities via an out-of-band channel.

10. The apparatus of claim 8, wherein the logic coupled to the one or more substrates is to provision an SMI transfer monitor (STM) with the one or more telemetry thresholds, and wherein the STM is to collect telemetry information associated with the over current condition, wherein the data center fleet manager notification includes the telemetry information, and wherein the data center fleet manager notification is issued to a scalability component of a hyperscale data center.

11. The apparatus of claim 6, wherein the logic coupled to the one or more substrates includes transistor channel regions that are positioned within the one or more substrates.

12. At least one non-transitory computer readable storage medium comprising a set of executable program instructions, which when executed by a computing system, cause the computing system to:
receive at a primary circuit board an indication of a detected over current condition associated with a first voltage regulator on a secondary circuit board in the computing system, wherein the computing system comprises a plurality of circuit boards, each of the plurality of circuit boards including a voltage regulator and a processor coupled to the voltage regulator, wherein the plurality of circuit boards includes the primary circuit board and the secondary circuit board, the primary circuit board having a baseboard management controller (BMC), and wherein the indication is to be received while bypassing the BMC;
identify a configurable over current protection policy associated with the first voltage regulator;
automatically take a first protective action based on the configurable over current protection policy, wherein the first protective action includes one or more of a frequency throttle of a first processor on the secondary circuit board in isolation from one or more additional processors in the computing system, or a deactivation of the first processor in isolation from the one or more additional processors, wherein the first protective action is to be communicated to the secondary circuit board while bypassing the BMC, and
initiate, via a communication from the BMC to a remote administrator, a second protective action based on the configurable over current protection policy, wherein the second protective action includes one or more of a data center fleet manager notification or a migration of a workload from the first processor to at least one of the other processors,
wherein the first protective action and the second protective action are each responsive to the indication of the detected over current condition.

13. The at least one non-transitory computer readable storage medium of claim 12, wherein the instructions, when executed, further cause the computing system to bypass a power down of one or more circuit boards in the computing system.

14. The at least one non-transitory computer readable storage medium of claim 12, wherein the configurable over current protection policy is to include one or more telemetry thresholds and corresponding system management interrupt (SMI) capabilities.

15. The at least one non-transitory computer readable storage medium of claim 14, wherein the instructions, when executed, further cause the computing system to provision the BMC with the corresponding SMI capabilities via an out-of-band channel.

16. The at least one non-transitory computer readable storage medium of claim 14, wherein the instructions, when executed, further cause the computing system to provision an SMI transfer monitor (STM) with the one or more telemetry thresholds, and wherein the STM is to collect telemetry information associated with the over current condition, wherein the data center fleet manager notification includes the telemetry information, and wherein the data center fleet manager notification is issued to a scalability component of a hyper-scale data center.

17. A method comprising:
  receiving at a primary circuit board an indication of a detected over current condition associated with a first voltage regulator on a secondary circuit board in a computing system, wherein the computing system comprises a plurality of circuit boards, each of the plurality of circuit boards including a voltage regulator and a processor coupled to the voltage regulator, wherein the plurality of circuit boards includes the primary circuit board and the secondary circuit board, the primary circuit board having a baseboard management controller (BMC), and wherein the indication is received while bypassing the BMC;
  identifying a configurable over current protection policy associated with the first voltage regulator;
  automatically taking a first protective action based on the configurable over current protection policy, wherein the first protective action includes one or more of a frequency throttle of a first processor on the secondary circuit board in isolation from one or more additional processors in the computing system, or a deactivation of the first processor in isolation from the one or more additional processors, wherein the first protective action is to be communicated to the secondary circuit board while bypassing the BMC, and
  initiating, via a communication from the BMC to a remote administrator, a second protective action based on the configurable over current protection policy, wherein the second protective action includes one or more of a data center fleet manager notification or a migration of a workload from the first processor to at least one of the other processors,
  wherein the first protective action and the second protective action are each responsive to the indication of the detected over current condition.

18. The method of claim 17, further including bypassing a power down of one or more circuit boards in the computing system.

19. The method of claim 17, wherein the configurable over current protection policy includes one or more telemetry thresholds and corresponding system management interrupt (SMI) capabilities.

20. The method of claim 19, further including provisioning the BMC with the corresponding SMI capabilities via an out-of-band channel.

21. The method of claim 19, further including provisioning an SMI transfer monitor (STM) with the one or more telemetry thresholds, and wherein the STM collects telemetry information associated with the over current condition, wherein the data center fleet manager notification includes the telemetry information, and wherein the data center fleet manager notification is issued to a scalability component of a hyper-scale data center.

* * * * *